Aug. 23, 1966     KARL-HANS BURGER     3,268,147
CRATES FOR THE CARRIAGE AND STORAGE OF VARIOUS GOODS
Filed June 1, 1964     8 Sheets-Sheet 2
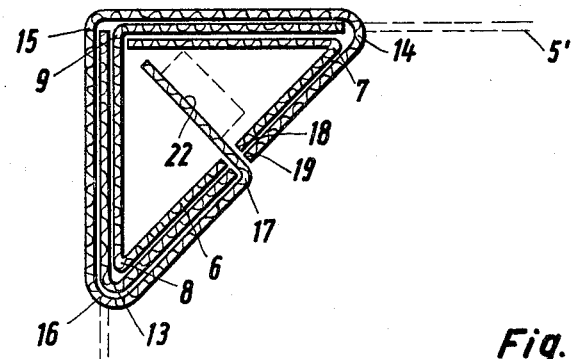
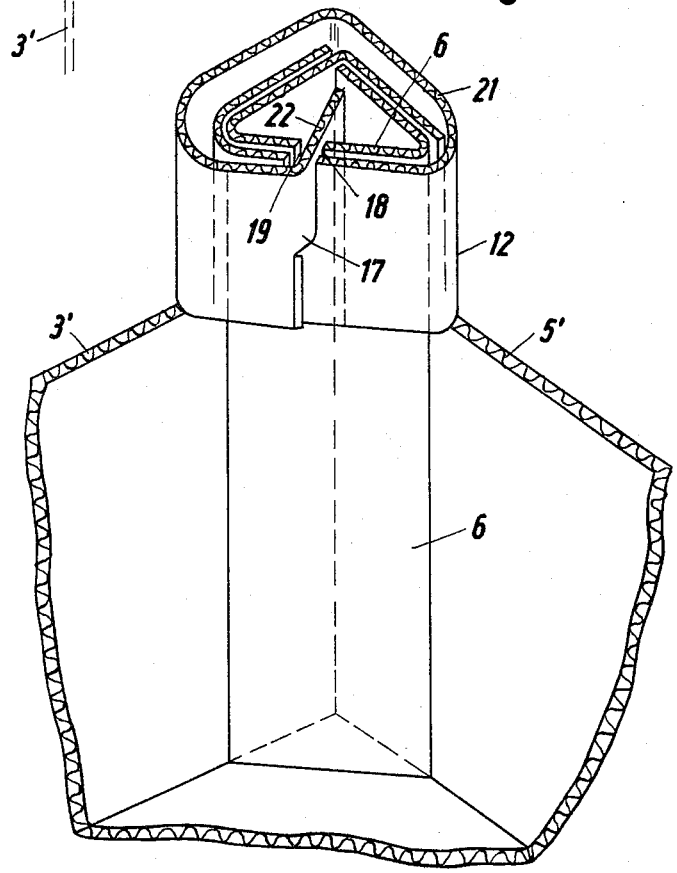
Inventor:
Karl-Hans Burger
Stevens, Davis, Miller & Mosher
Attorneys

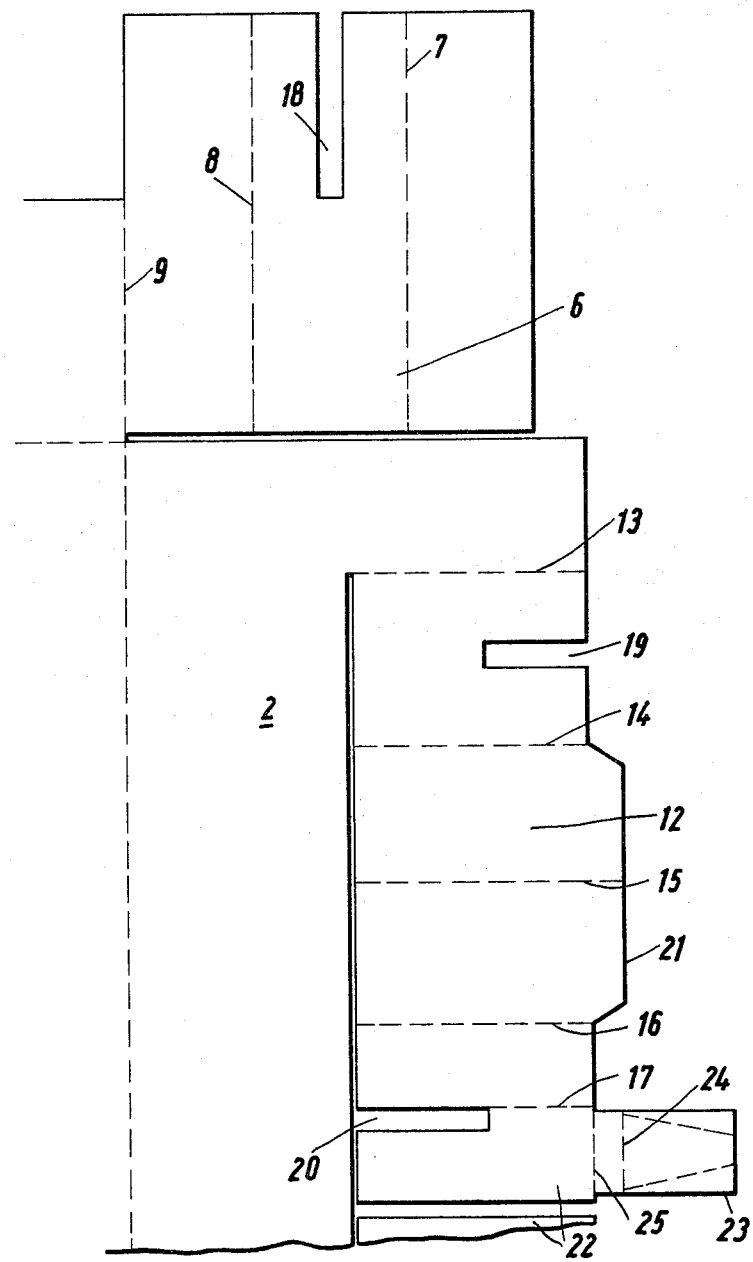

Inventor:
Karl-Hans Burger
Stevens, Davis, Miller & Mosher
Attorneys

Aug. 23, 1966  KARL-HANS BURGER  3,268,147
CRATES FOR THE CARRIAGE AND STORAGE OF VARIOUS GOODS
Filed June 1, 1964  8 Sheets-Sheet 5
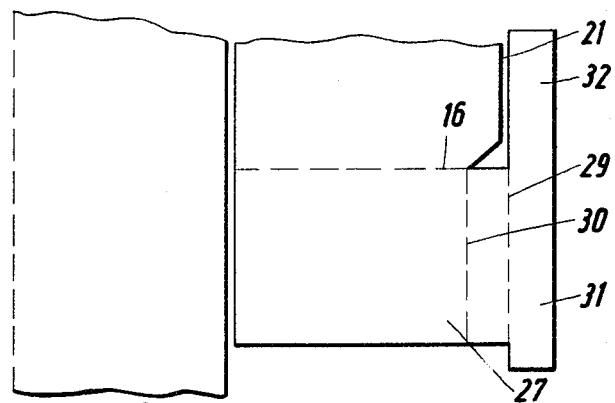
Fig. 6
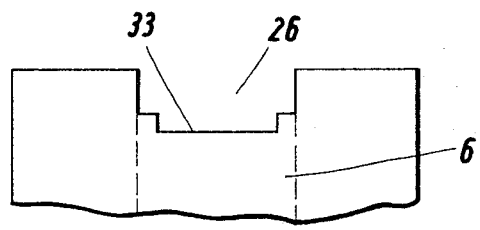
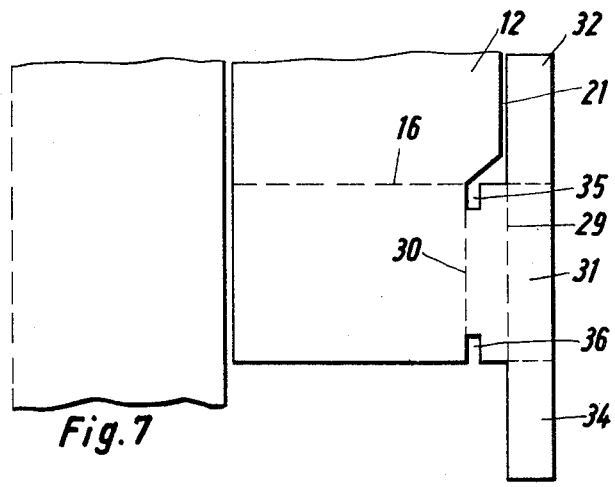
Fig. 7
Inventor:
Karl-Hans Burger
Stevens, Davis, Miller & Mosher
Attorneys Aug. 23, 1966  KARL-HANS BURGER  3,268,147
CRATES FOR THE CARRIAGE AND STORAGE OF VARIOUS GOODS
Filed June 1, 1964  8 Sheets-Sheet 7

Inventor:
Karl-Hans Burger
Stevens, Davis, Miller & Mosher
Attorneys

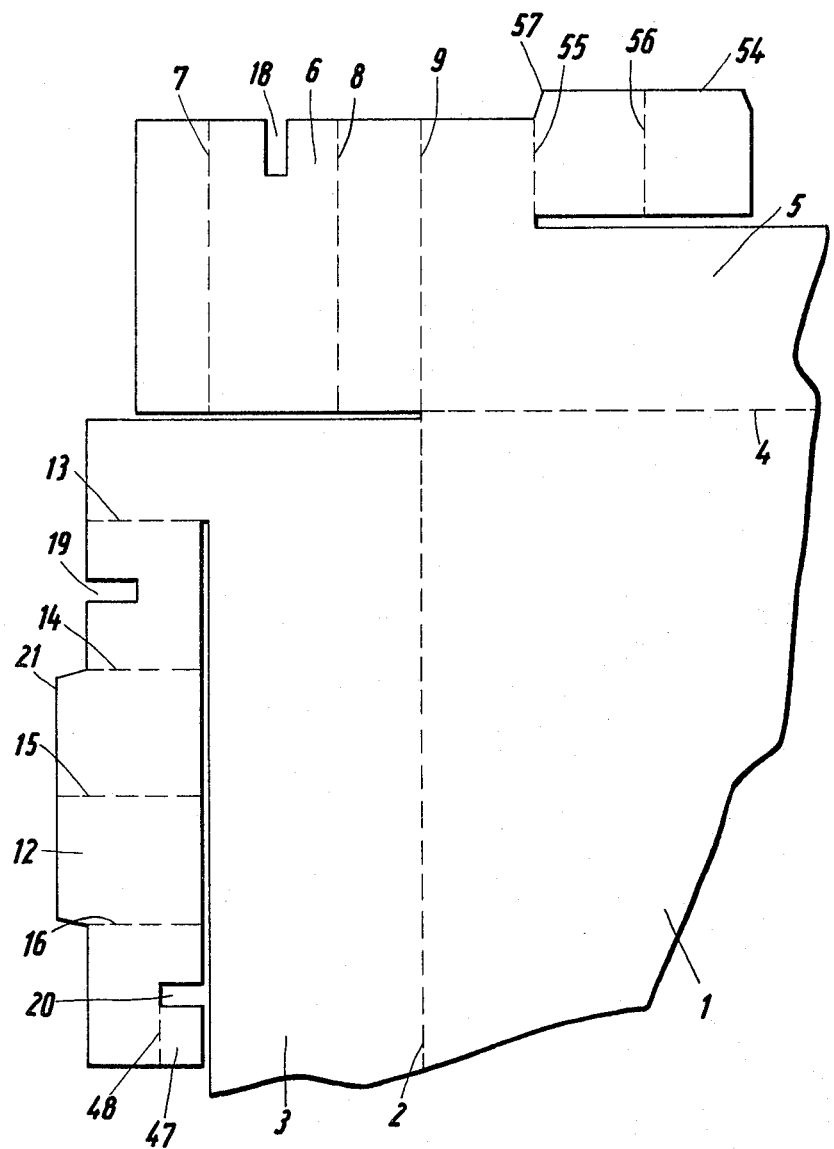

United States Patent Office 3,268,147
Patented August 23, 1966

3,268,147
CRATES FOR THE CARRIAGE AND STORAGE OF VARIOUS GOODS
Karl-Hans Burger, Gellerstrasse 23, Karlsruhe, Germany
Filed June 1, 1964, Ser. No. 371,330
Claims priority, application Germany, June 11, 1963, B 72,240; Aug. 3, 1963, B 72,995; Jan. 23, 1964, B 75,815
16 Claims. (Cl. 229—32)

The invention relates to crates for the carriage and storage of goods of the most varied kind, for example fruit, meat and fish products, agricultural produce and the like. Crates are used generally for transporting and storing fruits, vegetables, poultry, meat etc., as well as other goods which are packed in paper bags or wrappings of plastic material. The crates at the same time afford sufficient ventilation of the contents and, by virtue of supports introduced at their corners, can be stored in several tiers one above the other.

It is already known to make such crates of wooden parts but such creates, however, usually require rather considerable space on transport or storage before use, and thus represent bulky goods. After distribution or disposal of the contained goods, the storage of the empty crates also requires considerable space. Destruction of the crates is often troublesome and expensive. Moreover, crates made of wood are comparatively heavy, which unfavorably effects the cost of carriage of the contained goods.

For these reasons it has already been endeavored to replace the wooden crates by crates of cardboard, corrugated cardboard, or plastics material. In this regard it has already been suggested to construct the creates in conjunction with other materials, such as wood, parts of plastics materials, wire, sheet metal inserts, wire nails, rivets, etc. These crates presented advantages for particular purposes. They were, however, still too complicated in construction, and had generally to be assembled in a finished condition by the manufacturer, Thus, the hereinbefore mentioned disadvantage of too great a space requirement was not removed. If such crates were, however, supplied in individual parts, they could be assembled at the place of use only by trained, skilled personnel, which was also bound up with higher costs, quite apart from the time which was necessary in sorting out and suitably assembling the different, separate parts.

An object of the present invention is to obviate or mitigate the aforementioned disadvantages.

The present invention is for transporting and storing goods of the most varied kind, for example fruit, meat and fish products, agricultural produce and the like, a crate rectangular in horizontal section, and adapted to be made up from a blank of corrugated pasteboard, fiberboard, plastics material or the like, in which slits and notches are cut or stamped and crease or fold lines are formed so that there are provided a rectangular bottom panel, end panels having lateral extensions in each direction to be folded inwardly about two crease or fold lines to form load-bearing corner supports of triangular cross-section when the end panels are erected, and side panels each including flaps to be folded to enwrap completely said corner supports when the side panels are erected and having notches then to be interengaged to secure the flaps in the corner support enwrapping condition.

Crates in accordance with the invention presents a number of advantages. One advantage is, that the blank or flat piece of cardboard or plastics material can be punched or stamped out and creased mechanically in a single operation. In this manner, larger numbers of crates can be produced by mechanical means. For conveying to the place of use, the containers can be supplied or delivered as flat or plane sheets of cardboard whereby an exceptionally great saving in space and weight is afforded. At the place of use the crates can be erected, even by unskilled labor by folding the sides and ends and forming the stiffening and locking or closing elements simply from a flat piece of cardboard. Finally, there is the further advantage that, after use, the crates are taken to pieces or dismantled by simple manipulations and, without requiring much space are supplied for used as scrap.

In accordance with a particular embodiment of the invention the crate is of such an uncomplicated design of the plane, punched out and creased sheet, that flaps for forming corner supports further flaps for enwrapping the corner supports, for securing the enwrapment and if necessary for locking same, are provided at cut-out or incised side and end parts of a rectangular or square base or bottom panel. Moreover, two lateral flaps or panels can be provided on two, cut-out or incised side parts of each of the two end panels to be folded along three fold or crease lines to form four, right-angled corner supports of triangular cross-section.

Packaging containers or crates in accordance with the invention can be easily erected and used for a great variety of purposes. The required stability is obtained with a very high additional safety factor on the assumption, however, that a high-grade, tenacious cardboard is used. Additional holes for ventilation can be provided in the static parts of the bottom and side panels should ventilation from above be insufficient. If required, the long sides and/or the ventilation holes can be reinforced by pressed-on ribs of channel section of cardboard, plastics material, wood, metal or the like or by any adherent strips of such material.

It is further proposed, according to the invention, to provide means for locking purposes which will dispense with the necessity of holding the corner supports together by hand until locking is completed by the embracing wrapper flap.

In the case of certain goods, the pressure of the stacked goods must in part be taken up by the goods themselves which cannot provide security against slipping of the package. In order to avoid this disadvantage, a further embodiment of the invention provides a crate with means which enable stacking on one another of the crates in a manner in which the pressure is substantially taken up by the corner supports and security against slippage is provided.

In the case of crates of a certain depth, there is a danger, when the crate is lifted, that walls may buckle as a result of the increased weight content. To prevent this, there are provided reinforcing means on the side panels. It may also include openings serving as hand grips below the aforesaid reinforcing strips.

Embodiments of the invention will now be described, by way of example, with reference to the accompanying drawings, in which:

FIG. 2 shows a section of a wrapped corner, stiffener or support;

FIG. 3 is a perspective view of a corner part of the crate with enwrapped corner support according to the invention; and FIG. 4 shows a first alternate embodiment of the invention including a locking extension;

FIG. 6 is a fragmentary view showing a modification of the embodiment of FIG. 5, the main modification residing in the locking tab;

FIG. 7 shows a further modification of the embodiment according to FIG. 5 wherein FIG. 7a represents the upper portion of the blank and FIG. 7b represents the lower portion of the blank. This figure shows the proportions in the correct horizontal displacement but vertically compressed for the sake of economy in the drawings;

FIG. 10 illustrates an embodiment of the invention which is an alternative to that shown in FIG. 1.

Figure 1:
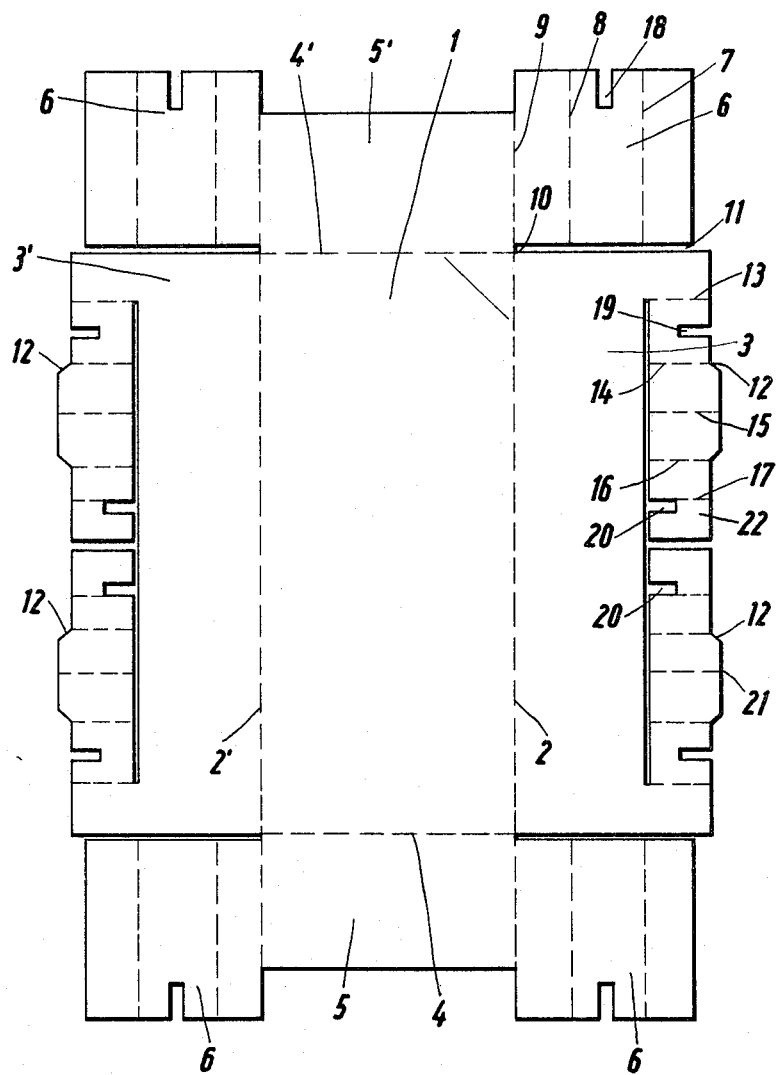
FIG. 1 shows the blank for a rectangular crate according to the invention.

In FIG. 1 which shows the blank of a crate or container in accordance with the invention, the reference 1 denotes a bottom panel which is of rectangular shape. The side panels 3 and 3' respectively, can be folded upwards along the broken lines 2 and 2' respectively and the side panels 5 and 5' respectively, can be similarly folded upwards along the broken lines 4 and 4' respectively, in order thus to form the actual container of the crate. The side panels 3, 3' and end panels 5, 5' are further provided with special, lateral flaps which constitute the actual supporting and stiffening elements of the crate. As can be seen from the drawing, four similar flaps are arranged symmetrically so that for the purpose of clarity in the further drawings, reference numerals appear only once for similar parts. The broken lines represent in general, fold or crease lines.

On the end panels 5, 5' there are provided corner supports 6 which are formed by folding lateral extensions along the crease or fold lines 7, 8 and 9 in such a manner that there is formed a right-angled structure with a triangular cross-section, which after erection has the right angle in the corner 10. The cut necessary for this purpose is shown at 11.

On the side panels 3, 3' there are provided wrapping flaps 12, which can be folded along the crease or fold lines 13, 14, 15, 16 and 17. After erection of the supports 6, the wrapper flaps are closely bent around these posts. For stabilizing the wrapper flaps 12, a notch 18 is cut in the corner support 6. A similar notch is made at 19 in the wrapper flap. These two notches come to be aligned. In order to close the wrapper flaps and make them fast to the corner supports, a further oppositely-directed notch 20 is provided. After tightly winding the wrapper round the corner support, the former is folded along the crease line 17 and is raised until the end can be inserted into the notches 18, 19. This firmly locks the wrapper on the corner support. The wrapper flaps 12 are further provided with projections 21 which after the wrapper flaps have been wound round the supports, come to be situated at the corner edges of the container and project above the corner supports. These projections have the purpose of engaging the bottom corners of the next crate, when a number of crates are stacked on one another and thus preventing the superposed containers from slipping.

The assembly of the crate from the FIG. 1 blank is shown in FIGS. 2 and 3 which show respectively a section and a perspective view of a corner part of the crate with a wrapped corner support. After folding the corner support 6 and setting up the side panel 3' and end panel 5', the wrapper flap 12 is firmly wound around the corner support 6. The end piece 22 is then bent over along the line 17, and inserted by means of its notch 20 into the two notches 18 and 19. This not only ensures a firm support of the side and end panels, but the corner post 6 is reinforced in such a manner that it not only stiffens the entire crate, but is also able to carry further crates set thereon. The projections 21 are effective against lateral slipping. Each wrapper flap 12 is joined to the side panel 3 or 3' by the crease of fold line 13 and is unitary with the side panel. It is therefore avoided that the wrapper flap, when wound around the corner support 6, can come out of its fastening position by shaking or vibration, and thus be loosened or detached from the erected corner support.

If corrugated or fluted pasteboard is used for the crate, it is advisable to have the corrugations of the pasteboard extending parallel to the fold or crease lines 7, 8, 9 of the corner supports 6.

FIG. 4 shows a corner part of a blank for a crate according to a further embodiment of the invention. The outer or end piece 22 of the wrapper flap 12 has an extension 23 which for the purpose of locking the closure, is pressed into the interior of the corner support 6 by way of the two fold or crease lines 24 and 25.

Figure 5:
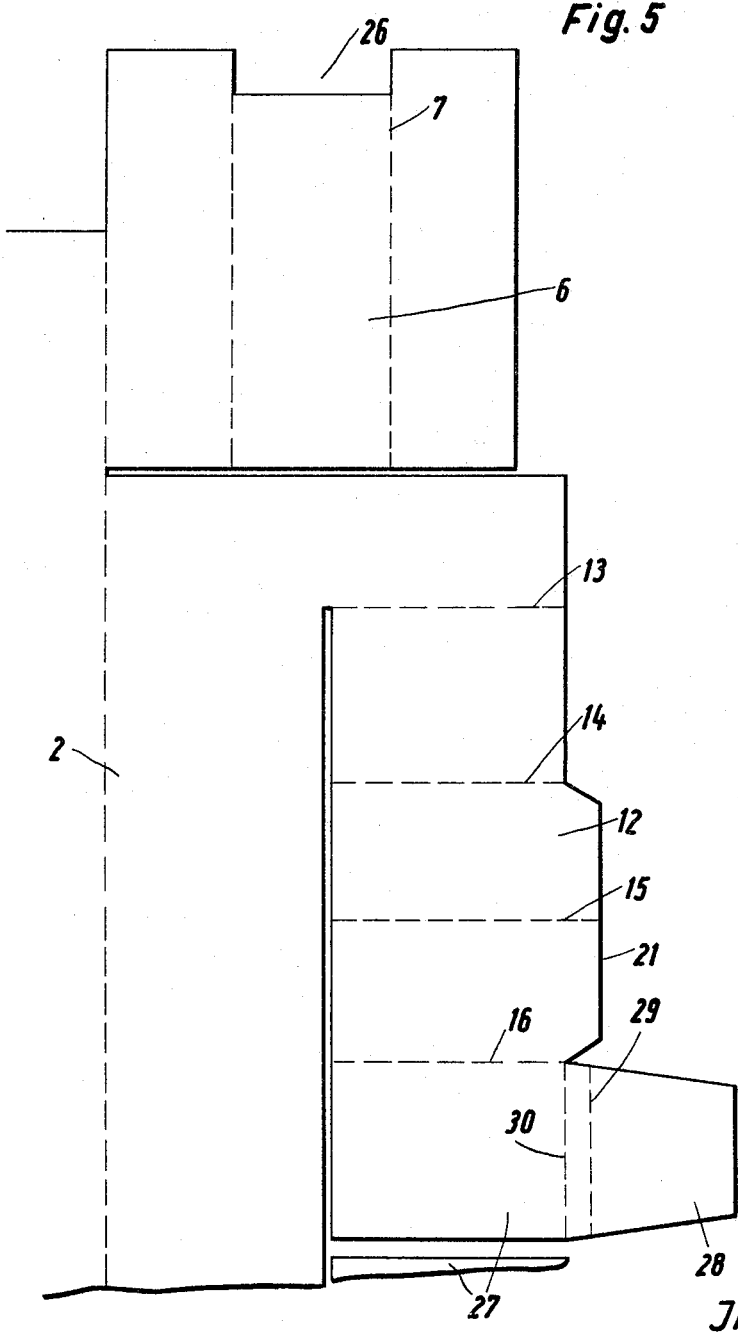
FIG. 5 illustrates another alternate embodiment having wider corner portions and therefore a fewer number of folds as well as having a locking extension.

As shown in FIG. 5, and in accordance with a further embodiment of the invention, the corner support 6 is provided with a wider recess 26. The outer or end piece 27 of the wrapper flap 12, does not have a fifth crease or fold line such as that denoted 17 in the previously-described embodiments, and is provided with an extension 28 which can be folded along the crease or fold lines 29 and 30. After the wrapping flap 12 has been wound around the corner support 6, the extension 28 of the wrapper flap 12 can be inserted through the recess 26 into the interior of the corner post 6. Because of this, the notches 19 and 20 are no longer necessary.

FIG. 6 is a partial view corresponding to FIG. 5 but showing a modification of the latter. In this modification, the outer or end piece 27 is provided with a tab 31 projecting to both sides. The tab 31 has an extended portion 32 for locking the closure by being pressed into the corner support.

FIG. 7 shows a further modification of the embodiment according to FIG. 5. FIG. 7a illustrating the upper portion of the corner support 6 with an additional notch 33 in its recess 26. The outer or end piece 27 of the wrapper flap 12, shown in FIG. 7b, also has a tab 31 projecting to both sides, which, however, has two extended portions 32 and 34. The innermost part of the wrapper flap 12 must of course also have a notch as at 33. This is, however, not shown in the figure. Between the two crease or fold lines 29 and 30, the tab 31 has two notches 33 and 36, to enable the tab to be inserted in the corner support, its portions 32 and 34 then filling the interior of the corner support. This also ensures locking and setting of the wrapper flap.

Figure 8:
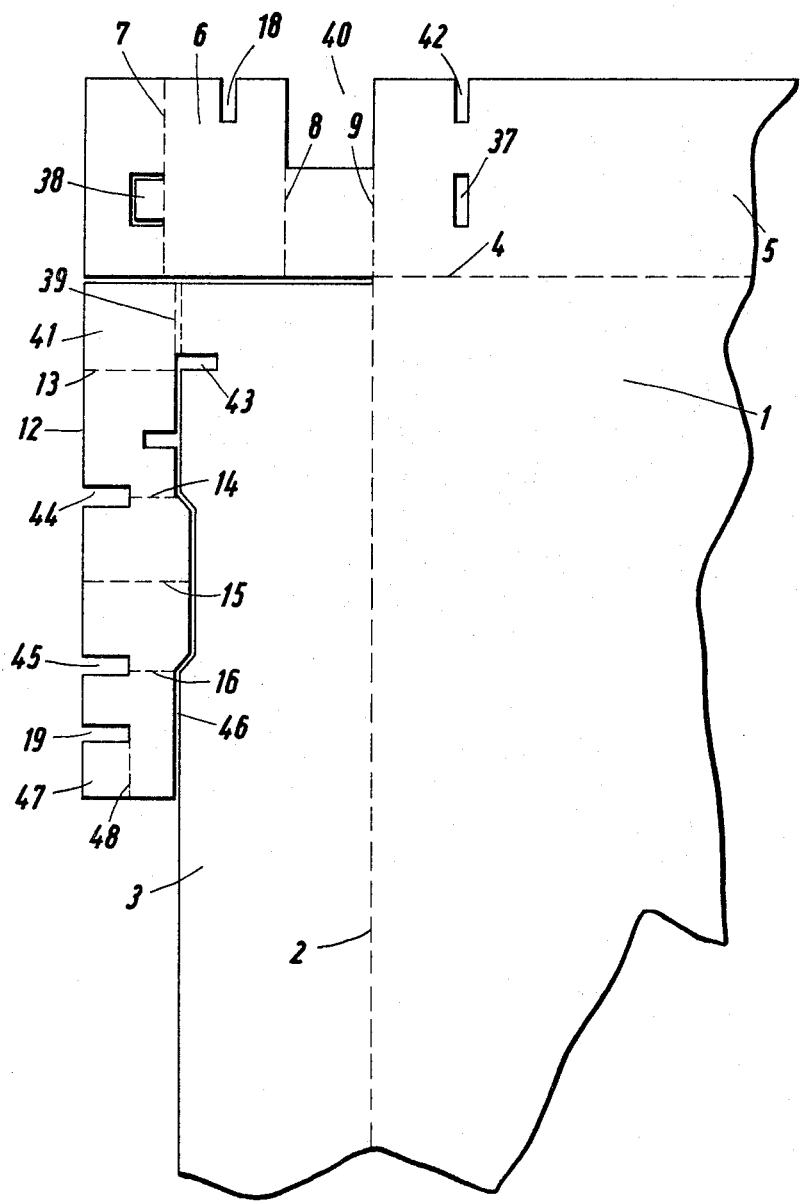
FIG. 8 illustrates another alternate embodiment including means for temporarily holding the corner support in the assembled condition.

In FIG. 8 the reference numeral 1 denotes the bottom of the crate, which is of rectangular form. The side or panel wall 3 can be folded upwards along the crease or fold line 2, and the end wall or panel 5 can be folded upwards along the crease or fold line 4. The corner support is formed of a flap on the end wall or panel 5 and is folded along the crease or fold lines 7, 8 and 9. The end panel 5 has a slit-like opening 37 into which the stamped-out tab 38 catches or snaps after erection of the corner support 6, whereby the corner support is temporarily held in shape.

The side panel 3 includes a wrapper flap 12 which can be folded downwardly along the crease or fold line 39, i.e. towards the side panel 3. After folding, it lies against the inner surface of the side panel 3. The wrapper flap 12 can be folded along the crease or fold lines 12, 14, 15 and 16. The corner support 6 has a recess 40 in which the part 41 of the flap 12 comes to lie at the commencement of wrapping. The side panel 3 and end panel 5 also have two further slits 42 and 43 with which are engaged the slits 44 and 45 after the corner support has been wrapped by the flap. The wrapper flap 12 is separated from the panel 3 along the length of the cut 46. The part 47 can be folded along the crease or fold line 48 and serves to form a lock when the notch 19 is engaged with the notch 18 of the corner support, to complete the closure.

Figure 9:
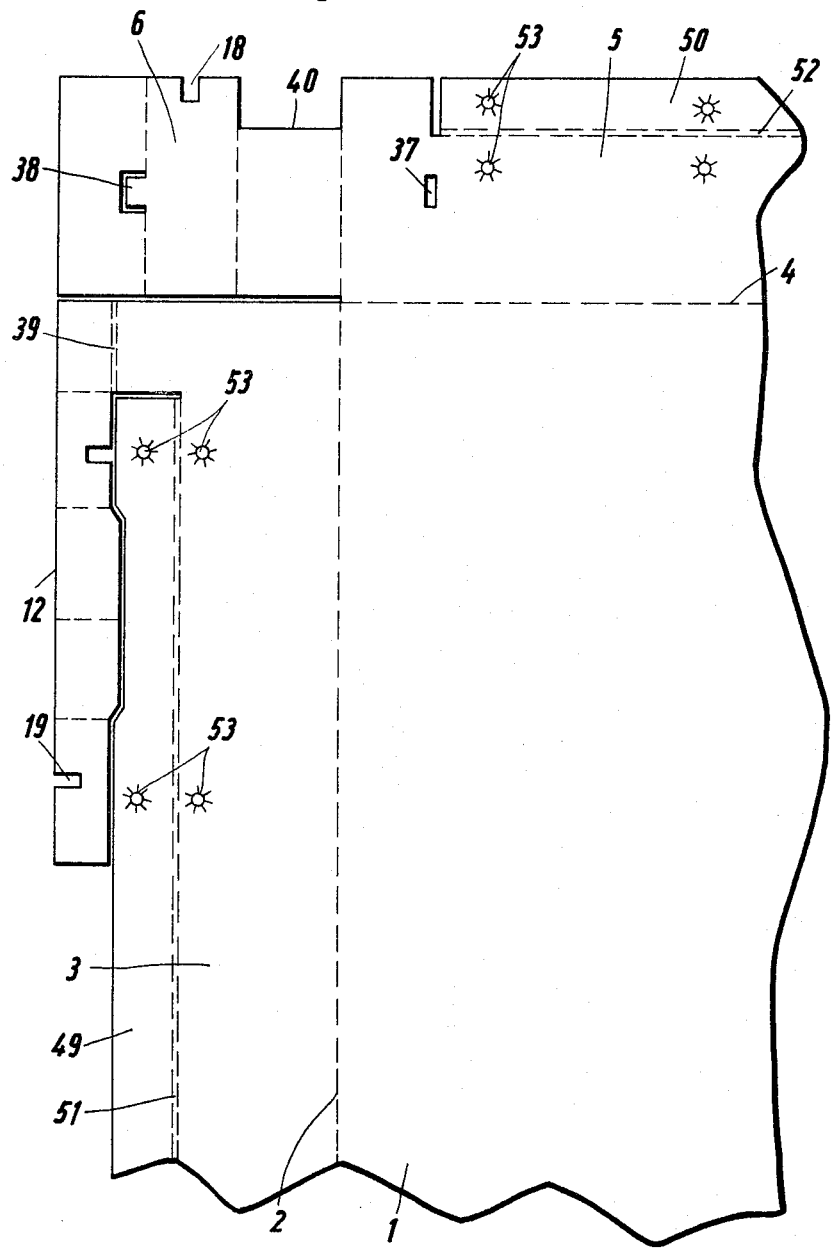
FIG. 9 is a modified embodiment of the crate according to FIG. 1 providing an extra longitudinal reinforcement means.

FIG. 9 shows a somewhat modified embodiment of the crate according to FIG. 1. In this case, the side panel 3 and end panel 5 are provided with further, longitudinal flaps 49 and 50, which can be folded along the crease or fold lines 51 and 52 against the inner or outer sides of the side panels. These longitudinal flaps can be united at the adhesive areas 53 with the side panels. This provides a reinforcement of the side panels, particularly for crates of relatively considerable depth or length. The remaining reference numerals denote similar parts to those in FIG. 8. It is, of course, also possible to replace the adhesive areas 53 by staples or other suitable attaching means.

FIG. 10 shows finally a further development of a corner of a crate according to the invention. The remaining three corners of the crate are formed in the same way.

In FIG. 10, the bottom or base of the container is denoted by 1, and is of rectangular shape. The side panel 3 can be folded upwards along the crease or fold line 2 and the end panel 5 similarly folded upwards along the crease or fold line 4. The corner support 6 is formed from a flap on the end panel 5, which is folded along the crease or fold lines 7, 8 and 9. This produces a corner support of right-angled triangular cross-section, the right angle being at the corner edge 9. The end panel 5 has a tab 54 which can be folded along the crease or fold lines 55 and 56 in such a way that the fold line 56 comes to lie against the outer edge of the fold line 9. The tab 54 has an upwards projection 57 of about the same height as the projection 21 on the wrapper flap 12.

After the side panel 3 has been folded upwards, the wrapper flap 12 is folded around the corner support 6 together with the tab 54. This wrapper is folded for the purpose along the crease or fold line 13, 14, 15 and 16. The notch 19 then lies over the notch 18 in the corner support 6, and the notch 20 can be engaged with the two aforesaid notches. This holds the corner support together. To secure it, the part 47 can be folded upwards inside the corner support along the crease or fold line 48.

I claim:

1. For transporting and storing goods of the most varied kind, for example fruit, meat and fish products, agricultural produce and the like, a crate rectangular in horizontal section and adapted to be made up from a blank of corrugated pasteboard, fiberboard, plastics material or the like, said blank having slits therein, fold lines in said blank and providing in co-operation with said slits a rectangular bottom panel, two end panels, lateral extensions extending in each direction from each end panel, each extension being adapted to be folded inwardly about two fold lines to form load-bearing corner supports of triangular cross-section when the end panels are erected, and two side panels each including two flaps each adapted to be folded about fold lines to enwrap completely said corner supports when the side panels are erected, said flaps having therein notches then to be interengaged to secure the flaps in the corner support-enwrapping condition.

2. A crate as set forth in claim 1, including means for locking the secured flaps in place.

3. A crate as set forth in claim 2, in which the load-bearing corner supports are of right-angled triangular cross-section, the right angles being at the corner edges of the crate.

4. A crate as set forth in claim 3, in which the flaps have projections which are on the outside of and project above the enwrapped corner supports.

5. A crate as set forth in claim 4 in which the corner supports and the innermost parts of the flaps have notches which coincide when the supports are wrapped, and the outermost parts of the flaps have oppositely-directed notches which engage with the coincident notches when the supports are wrapped and thus secure the flaps in the corner support-enwrapping condition and lock them in place.

6. A crate as set forth in claim 5 including extensive pieces on said outermost part and fold lines in said extension pieces whereby said extension pieces can be folded into the said corner supports to lock the supports and flaps.

7. A crate in accordance with claim 6, including tabs on both sides of said outermost parts, said tabs being adapted to be pressed into the interiors of the corner supports to lock the supports and flaps.

8. For transporting and storing goods of the most varied kind, for example fruit, meat and fish products, agricultural produce and the like, a crate rectangular in horizontal section and adapted to be made up from a blank of corrugated pasteboard, fiberboard, plastics material or the like, said blank having slits therein, fold lines in said blank and providing in co-operation with said slits a rectangular bottom panel, two end panels, lateral extensions extending in each direction from each end panel, each extension being adapted to be folded inwardly about two fold lines to form load-bearing corner supports of triangular cross-section when the end panels are erected, and two side panels each including two flaps each adapted to be folded about fold lines to enwrap completely said corner supports when the side panels are erected, the corner posts each having a recess with a notch, the innermost parts of the flaps having corresponding recesses, and tabs extending to each side of the outermost parts of the flaps, said outermost parts having notches to engage the notches in the corner supports, and said tabs being insertable into the interiors of the corner supports and filling up said interiors.

9. A crate as set forth in claim 8, and made of corrugated pasteboard with the corrugations extending parallel to the fold lines of the corner supports.

10. A crate as set forth in claim 9, in which static parts of the bottom and side panels, which parts are under less stress have air holes for additional ventilation.

11. A crate as set forth in claim 10, including mechanically-applied adhesive rings of hard material reinforcing said ventilation holes.

12. A crate as set forth in claim 11, including adherent strips of hard material reinforcing the side and the bottom panels.

13. A crate as set forth in claim 12 in which the end panels have slit-like openings, and corresponding stamped-out tabs in the lateral extensions from which the corner supports are formed catch or snap into said openings for locking purposes.

14. A crate as set forth in claim 13 including longitudinal flaps on the side and end panels, said flaps folded on to the panels and secured thereto.

15. A crate as set forth in claim 14, in which opposed panels are provided below the reinforcing flaps with openings acting as hand-holes.

16. A crate as set forth in claim 15, in which the end panels include tabs to reinforce the securing of the corner support and which pass around the outer surfaces of the latter and are themselves enwrapped by the flaps.

References Cited by the Examiner

UNITED STATES PATENTS

| | | | |
|---|---|---|---|
| 2,844,293 | 7/1958 | Whitney | 229—6 |
| 3,055,573 | 9/1962 | Carter | 229—6 X |

FOREIGN PATENTS

| | | |
|---|---|---|
| 927,863 | 6/1963 | Great Britain. |
| 964,940 | 7/1964 | Great Britain. |

JOSEPH R. LECLAIR, *Primary Examiner.*

FRANKLIN T. GARRETT, *Examiner.*

D. T. MOORHEAD, *Assistant Examiner.*